US010905225B2

(12) United States Patent
Flores

(10) Patent No.: US 10,905,225 B2
(45) Date of Patent: Feb. 2, 2021

(54) SECURING DEVICE FOR TOOL

(71) Applicant: WEST COAST CHAIN MFG. CO., Ontario (CA)

(72) Inventor: Jesus Flores, Moreno Valley, CA (US)

(73) Assignee: West Coast Chain Mfg. Co., Ontario, CA (US)

( * ) Notice: Subject to any disclaimer, the term of this patent is extended or adjusted under 35 U.S.C. 154(b) by 0 days.

(21) Appl. No.: 16/215,457

(22) Filed: Dec. 10, 2018

(65) Prior Publication Data

US 2019/0374014 A1    Dec. 12, 2019

Related U.S. Application Data

(63) Continuation of application No. 16/004,251, filed on Jun. 8, 2018.

(51) Int. Cl.
*A45F 5/00* (2006.01)
*B23B 45/00* (2006.01)
*B25F 5/02* (2006.01)

(52) U.S. Cl.
CPC .............. *A45F 5/00* (2013.01); *B23B 45/003* (2013.01); *B25F 5/02* (2013.01); *A45F 2200/0575* (2013.01)

(58) Field of Classification Search
CPC ......... A45C 2013/1061; A45C 13/1038; A45F 2200/0575; A45F 5/021; A45F 2005/023; B25H 3/006
USPC .................................................. 224/902, 904
See application file for complete search history.

(56) References Cited

U.S. PATENT DOCUMENTS

| | | | |
|---|---|---|---|
| 673,821 A * | 5/1901 | Rahn | A24F 23/02 383/99 |
| 4,255,502 A * | 3/1981 | Taylor, III | H01M 2/10 429/120 |
| 5,653,337 A | 8/1997 | Cirigliano | |
| 5,782,821 A * | 7/1998 | Couch | A61B 46/10 383/71 |
| 6,279,741 B1 | 8/2001 | Arvin | |
| 2005/0263418 A1* | 12/2005 | Bastus Cortes | A45C 11/00 206/320 |
| 2007/0114141 A1 | 5/2007 | Mikesell et al. | |
| 2011/0019939 A1* | 1/2011 | Schwarz | B65D 33/04 383/12 |

(Continued)

FOREIGN PATENT DOCUMENTS

GB    2493333 A    2/2013

OTHER PUBLICATIONS

International Search Report and Written Opinion for International Application No. PCT/US2019/036084, dated Oct. 21, 2019, 13 pages.

*Primary Examiner* — King M Chu

(74) *Attorney, Agent, or Firm* — Lewis Roca Rothgerber Christie LLP

(57) ABSTRACT

A case for a tool having a pocket with a base panel, first and second side panels, first and second end panels, and first and second slots. A first strap having a first proximal end affixed to the pocket first and a first distal end and a second strap having a second proximal end affixed to the pocket and a second distal end. The first and second straps are configured to crisscross each other, and the first distal end is configured to pass through the first slot and the second distal end is configured to pass through the second slot.

16 Claims, 13 Drawing Sheets

(56) References Cited

U.S. PATENT DOCUMENTS

2016/0067862 A1\* 3/2016 Moreau ..................... A45F 5/00
206/349

\* cited by examiner

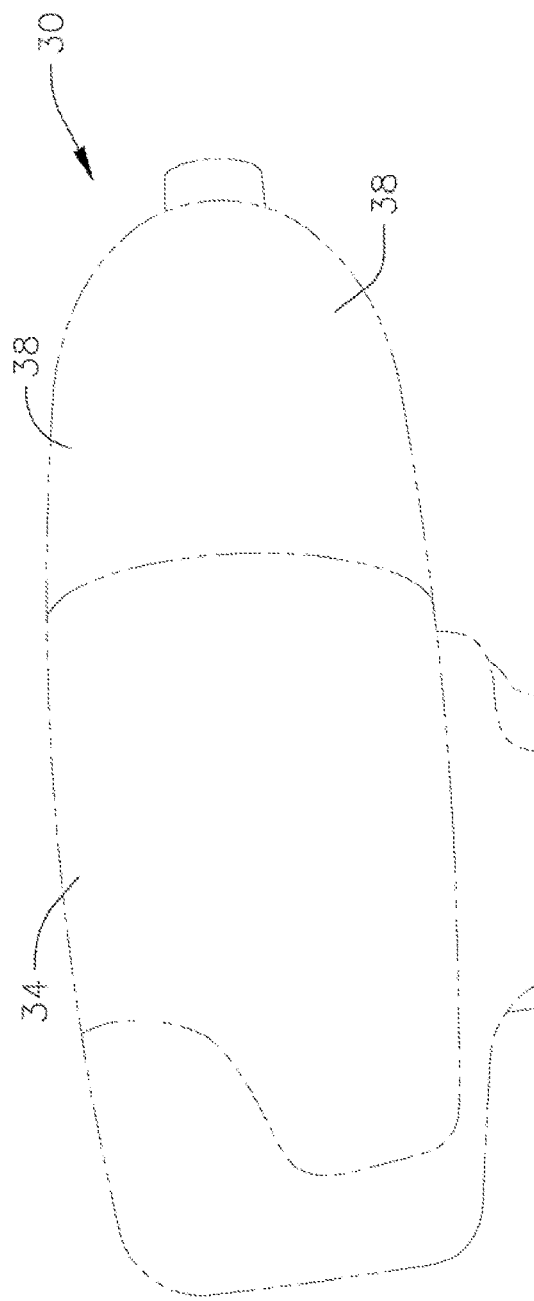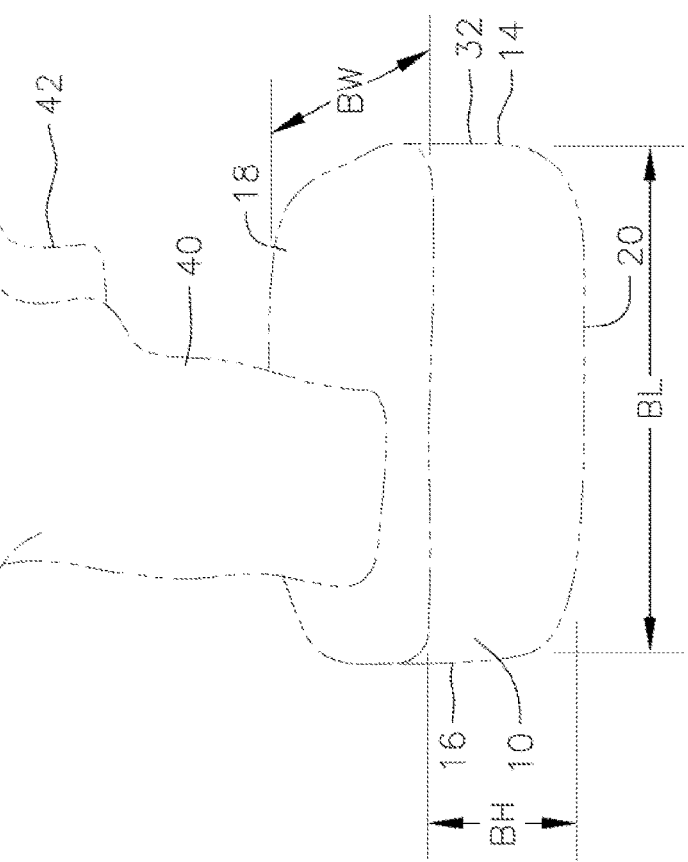
FIG. 2

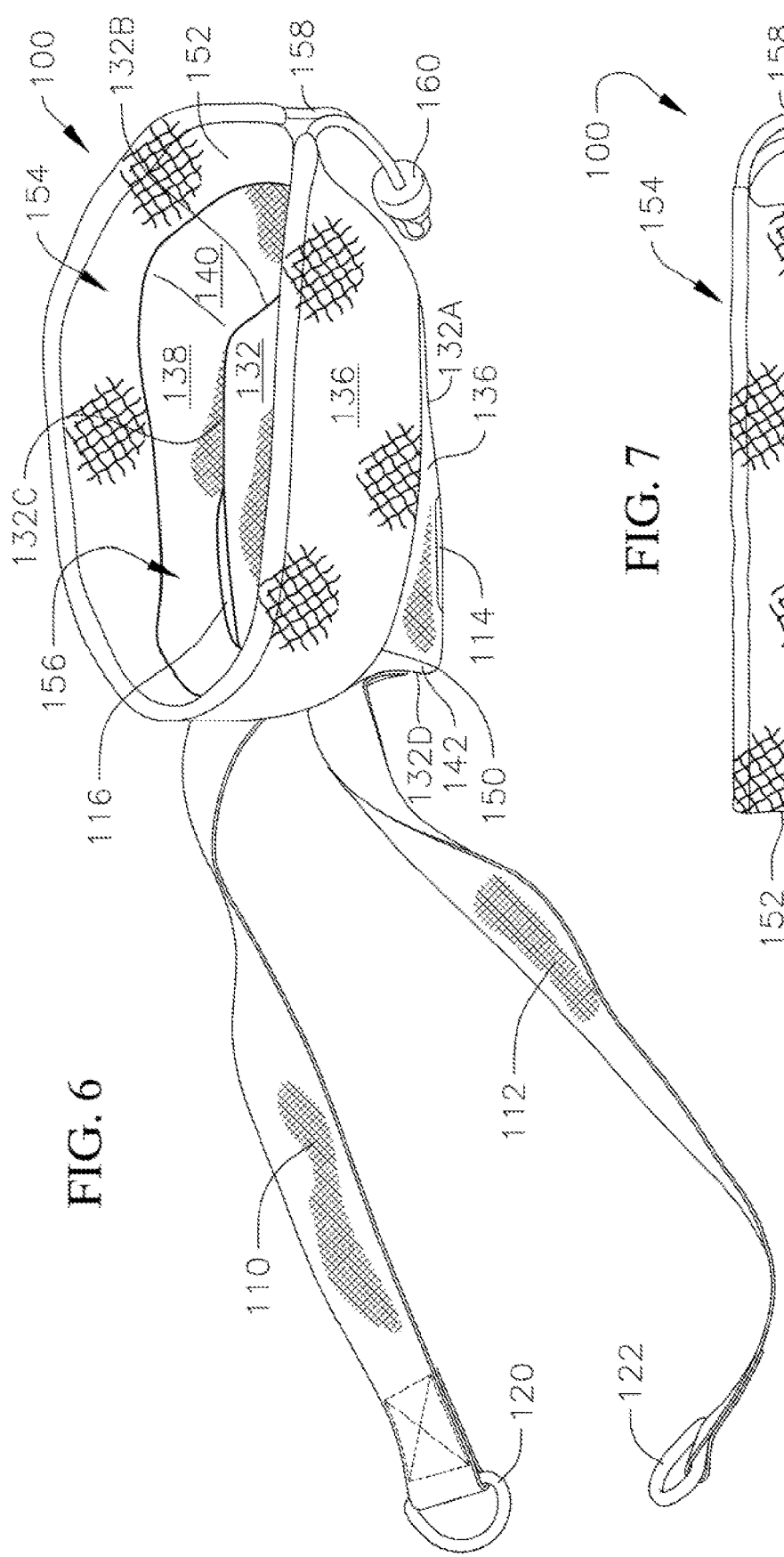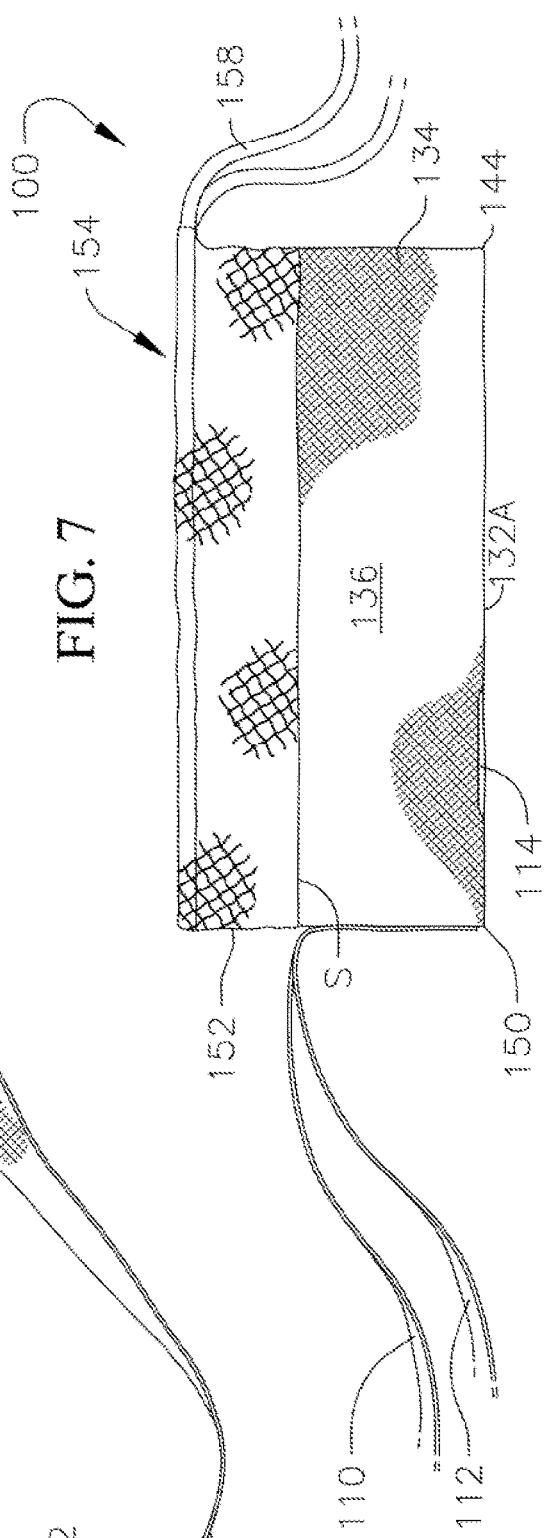

SECURING DEVICE FOR TOOL

CROSS-REFERENCE TO RELATED APPLICATION(S)

This application is a continuation of U.S. application Ser. No. 16/004,251, filed Jun. 8, 2018, the entire content of which is incorporated herein by reference.

BACKGROUND

1. Field

Some embodiments of the present disclosure relate generally to tool safety equipment.

2. Description of the Related Art

The construction of high-rise buildings and tall structures poses a particular risk when workers use tools from great heights above the ground. A tool dropped from an upper floor of a high-rise building could result in serious injury or death if the dropped tool were to strike a person. Fall protection violations, including dropped tools, continue to rank high on OHSA's list of violations. In fact, there are more than 50,000 "struck by falling object" OSHA recordables every year in the United States, alone. That is about the equivalent of one injury from a dropped object every 10 minutes.

Unsecured items that can cause serious injury range from heavier hand-tools, such as hammers, to lighter hand-tools, such as tape measures. In fact, a man making a delivery to a construction site in New Jersey was killed by a one-pound tape measure dropped by a worker from 50 stories above. Not only do dropped tools pose a risk to the people below, the person who dropped the tool is also at risk, as his first reaction may be to reach for the falling object which may cause him to lose his balance.

Debris nets, toe boards and helmets help but they have their limitations. Effectiveness of debris nets depends on the net hole dimensions, that is, smaller objects can fall through. Toe boards protect only the workers immediately below and can also pose trip hazards for workers. More importantly, both of these safety measures have to withstand considerable force—an eight-pound wrench dropped 200 feet would hit with a force of 2,833 pounds per square inch. A better solution would be to prevent the drop in the first place.

Tethering the tool or equipment to the user is known. However, any drop prevention measure should minimize interference with the normal use or function of the tool or equipment being tethered. Moreover, any tether, straps or case should be readily adjustable and adapted for use with tools that vary to some degree in size, weight and/or configuration. Additionally, the tethered tool should hang in a stable manner that capitalizes on the tool's center of gravity to minimize swing or swaying. Furthermore, any fasteners that are used to retain the tool should tolerate repeated use without excessive wear and tear and/or decrease in effectiveness. Selected fasteners, such as of the hook and loop type, are effective at the outset, but over time they tend to collect dirt, hair and other debris which reduce their hold performance.

An easy-to-use tethered securing device or case is therefore needed that can accommodate a variety of tools, where such case is readily adjustable and adapted for use with multiple tools and equipment that vary to some degree in size, weight and/or configuration. The case should not interfere with the normal use of the tool and should consider the center of gravity of the tool in minimizing swing and swaying when tethered. Also, any fasteners provided on the case should allow for repeated use without excessive wear and tear and/or decrease in effectiveness.

The above information is only for enhancement of understanding of the background of embodiments of the present disclosure, and therefore may contain information that does not form the prior art.

SUMMARY

Some embodiments of the present disclosure provide a case for a tool comprising a pocket having a base panel, first and second side panels, first and second end panels, and first and second slots, a first strap having a first distal end and a first proximal end, the first proximal end affixed to the pocket, and a second strap having a second distal end and a second proximal end, the second proximal end affixed to the pocket, where the first and second straps are configured to crisscross each other, and the first distal end is configured to pass through the first slot and the second distal end is configured to pass through the second slot.

In some embodiments, the first strap is configured to pass through the first slot from inside the pocket and the second strap is configured to pass through the second slot from inside the pocket.

In some embodiments, the first and second distal ends are configured to converge outside of the pocket.

In some embodiments, the case further comprises a first fastener affixed to the first distal end of the first strap, and a second fastener affixed to the second distal end of the second strap.

In some embodiments, the pocket is configured to receive a base portion of the tool.

In some embodiments, the base portion includes a rechargeable battery.

In some embodiments, the tool includes a handle and an active portion that remain outside of the pocket.

In some embodiments, the first and second straps crisscross over the base portion of the tool.

In some embodiments, the first and second straps crisscross around a handle of the tool.

In some embodiments, a case for a tool comprises a pocket having a base panel, first and second side panels, first and second end panels, and first and second slots, a first strap having a first distal end and a first proximal end, the first proximal end affixed to the pocket, a second strap having a second distal end and a second proximal end, the second proximal end affixed to the pocket, and an upper portion extending from at least one of the first side panel, second side panel, first end panel and second end panel. In some embodiments, the first and second straps are configured to crisscross each other, and the first distal end is configured to pass through the first slot and the second distal end is configured to pass through the second slot.

In some embodiments, the tool includes a base portion and the first and second straps are configured to crisscross over the base portion.

In some embodiments, the tool includes handle portion and the first and second straps are configured to crisscross around the handle.

In some embodiments, the case further comprises a first ring fastener affixed to the first distal end of the first strap and a second ring fastener affixed to the second distal end of the second strap.

In some embodiments, the pocket comprises a canvas material.

In some embodiments, the upper portion comprises one of a woven material.

In some embodiments, a method of securing a tool comprises providing a case having a pocket, a first strap, a second strap, a first slot and a second slot, placing a base portion of a tool in the pocket, crisscrossing the first and second straps across the base portion, passing a distal end of the first strap through the first slot, passing a distal end of the second strap through the second slot, and converging the distal ends of the first and second straps outside the pocket.

In some embodiments, the case includes an upper portion, and the method further comprising enclosing the upper portion around the based portion of the tool.

In some embodiments, the method further comprises fastening the distal ends of the first and second straps to a fastener.

In some embodiments, the pocket has a first material and the upper portion has a second material.

In some embodiments, the first material includes canvas and the second material includes one of a woven material, a mesh material and a netting material.

BRIEF DESCRIPTION OF THE DRAWINGS

Some embodiments can be understood in more detail from the following description taken in conjunction with the accompanying drawings, in which:

FIG. 2 depicts a tool, namely, a cordless drill according to various embodiments of the present invention;

FIG. 6 depicts a case for a tool from a side perspective according to various embodiments of the present invention;

FIG. 7 depicts a case for a tool from a side perspective according to various embodiments of the present invention;

DETAILED DESCRIPTION

Figure 1:
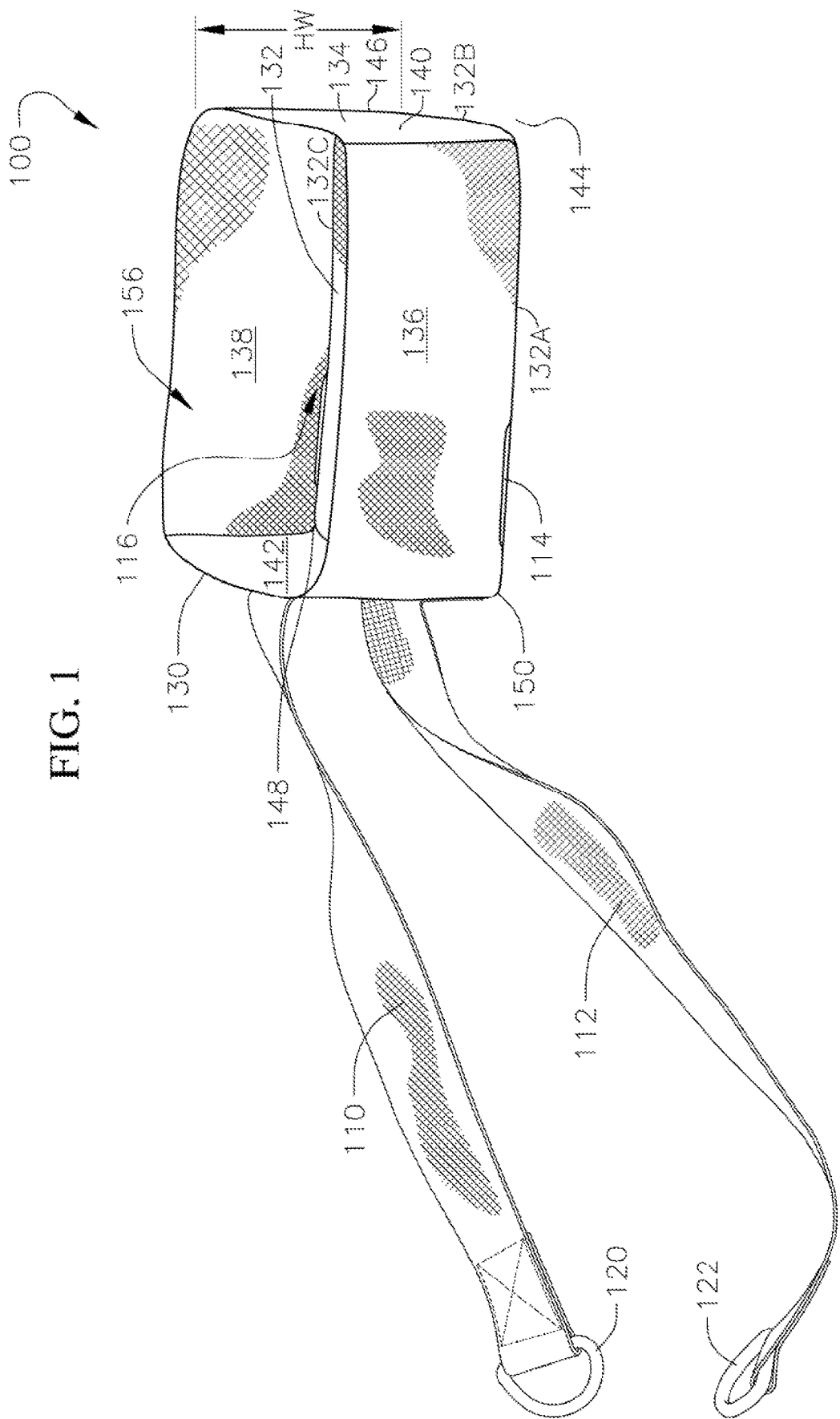
FIG. 1 depicts a case for a tool from a side perspective according to various embodiments of the present invention.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof will not be repeated. The drawings are not necessarily to scale and the relative sizes of elements, layers, and regions shown may be exaggerated for clarity.

Embodiments of the present disclosure include a case for a tool for use with a safety tether that is attachable to a person, device and/or structure. In various embodiments, the case is configured for use with a cordless power tool with a battery pack or portion, such as a cordless drill. The case is configured to allow easy deposit and removal of the cordless power tool, or a portion thereof, in and out of the case and to securely retain the tool, while also allowing for the normal, uninhibited and/or unobstructed use of the tool and any additional features of the tool while it is secured to the case.

Figure 3:
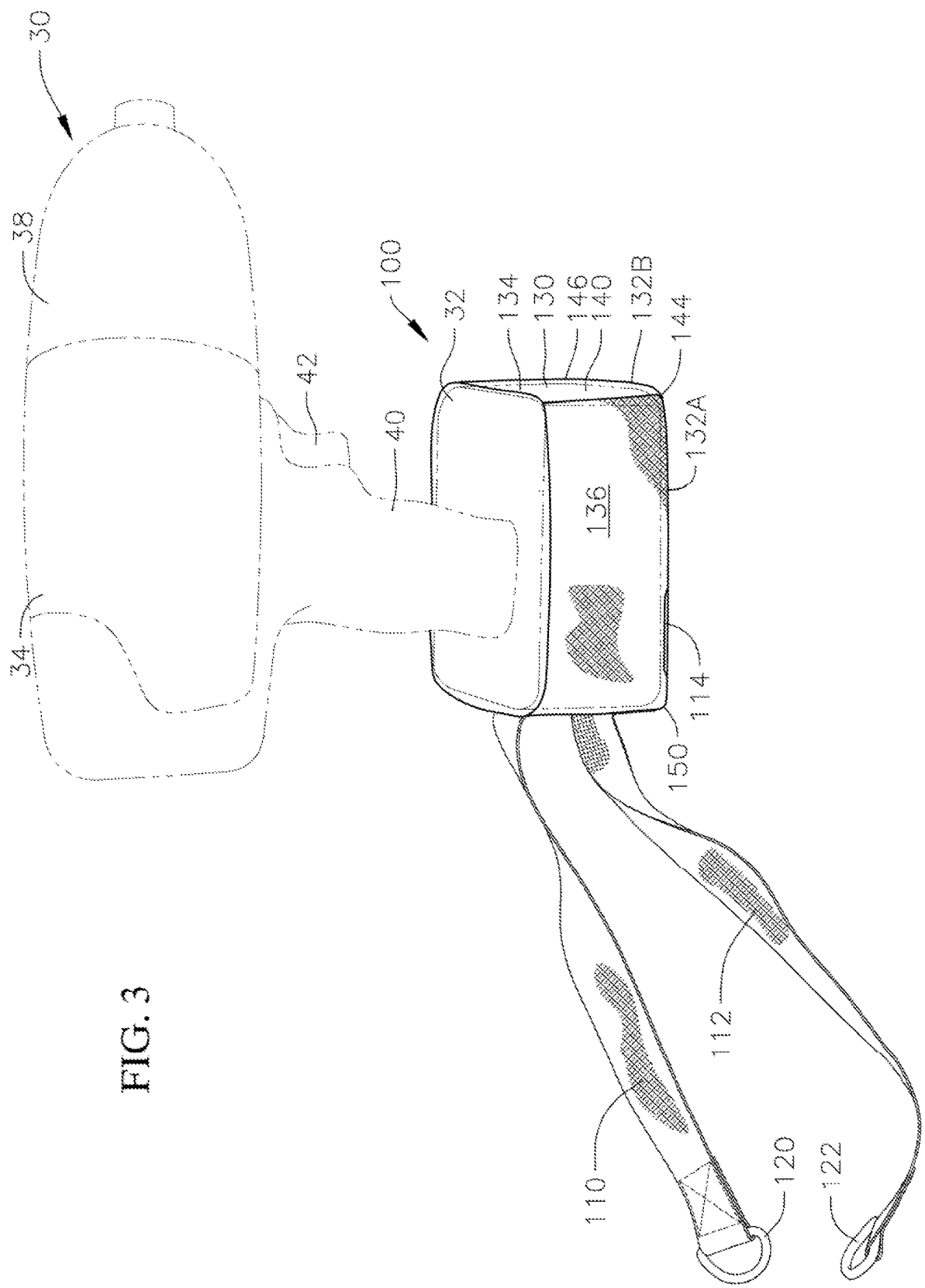
FIG. 3 depicts the case for a tool with a sample tool, namely, a cordless drill in the case from a side perspective according to various embodiments of the present invention.

FIG. 1, FIG. 2 and FIG. 3, depict a case 100 for a tool, including a power tool, according to various embodiments of the present invention. In various embodiments, the power tool may include a cordless drill 30 ("tool" and "drill" used interchangeably herein). As shown in FIG. 2, many cordless drills may be viewed as having an active portion and a base portion. The active portion of the drill 30 includes an upper assembly 34 that houses a motor 36 (36 not depicted) and includes a rotating drill end 38 that attaches to a bit. Extending downward from the upper assembly is a handle 40 which includes a trigger 42 for activating the drill and controlling the speed of the rotating drill end 38. At least a portion of the bottom end of the handle 40 often includes a hollow portion 44 (44 not depicted) containing electrical contacts 46 (46 not depicted). Connected at the end of the handle is the lower portion 32, e.g., a battery portion or battery. The battery portion 32 is shaped in a somewhat block form, with a length BL, height BH and width BW, however, the size and shape of the battery may vary. The battery 32 of the cordless drill 30 includes first and second side surfaces 10 and 12 (12 not shown), front and rear surfaces 14 and 16, and upper and lower surfaces 18 and 20 (20 not shown). The upper surface 18 includes a connection 24 (not shown) that sometimes (e.g., for certain brands) generally cylindrical shape that extends upwards from the upper surface 18 and is configured to match hollow portion 44 of the drill and to make an electrical connection between the battery and the tool. However, many batteries may simply have a slot or sliding mechanism for attaching to the hollow portion 44 of the drill 30 to make the electrical connection. A locking mechanism 48 (48 not shown) is included to ensure the battery is securely attached to the cordless drill 30. Many batteries also include a release mechanism on the first and second side surfaces 10 and 12 configured to release the locking mechanism 48 when the battery 32 needs to be changed.

The dimensions of the battery BL, BW, BH, may vary depending on brand, battery type, operating voltage, and overall capacity. For example, Lithium-based batteries are more energy dense than Nickel Cadmium batteries and therefore may be smaller in size. Higher capacity and/or higher voltage batteries require additional cells and are often larger than lower capacity/voltage batteries. Although batteries are generally shaped like a block, they may have rounded corners, angled sides (e.g., have a wedge shape), ornamental features, and accessory features. For example, BH may vary along BL to form a rounded or sloped front end of a battery.

The battery 32 is often relatively heavy when compared to remainder of the tool it is powering (e.g., the active portion of the tool including the handle 40, upper assembly 36, and motor 38). For example, in battery may be nearly as heavy as or heavier than the remainder of the cordless drill 30. Thus, in many examples, the drill 30 may be relatively balanced or bottom heavy once the battery is installed. Because the battery 32 is so relatively heavy, the drill 30 may have a center of gravity that is relatively low on the drill 30. Having a low center of gravity and a relatively flat lower surface 20 of the battery 32 allows for the drill 30 to stand on the battery 32 when placed on a flat surface.

In various embodiments, as shown in FIG. 3, the case 100 may be configured to provide a pocket 130 that substantially surrounds and retains at least the heavier base portion of the tool while leaving the active portion of the tool exposed and secures the tool such as a drill 30. In various embodiments, the case 100 may be configured to attach to a safety tether, as shown in FIG. 5, in a configuration where the case 100 has advantageous characteristics and functions, including reliably retaining a portion of the tool within the pocket, enabling normal use of the tool while secured to the case 100, preventing the tool from falling when dropped, and suspending the tool in a secured orientation with dampened swing or twisting.

Figure 5:
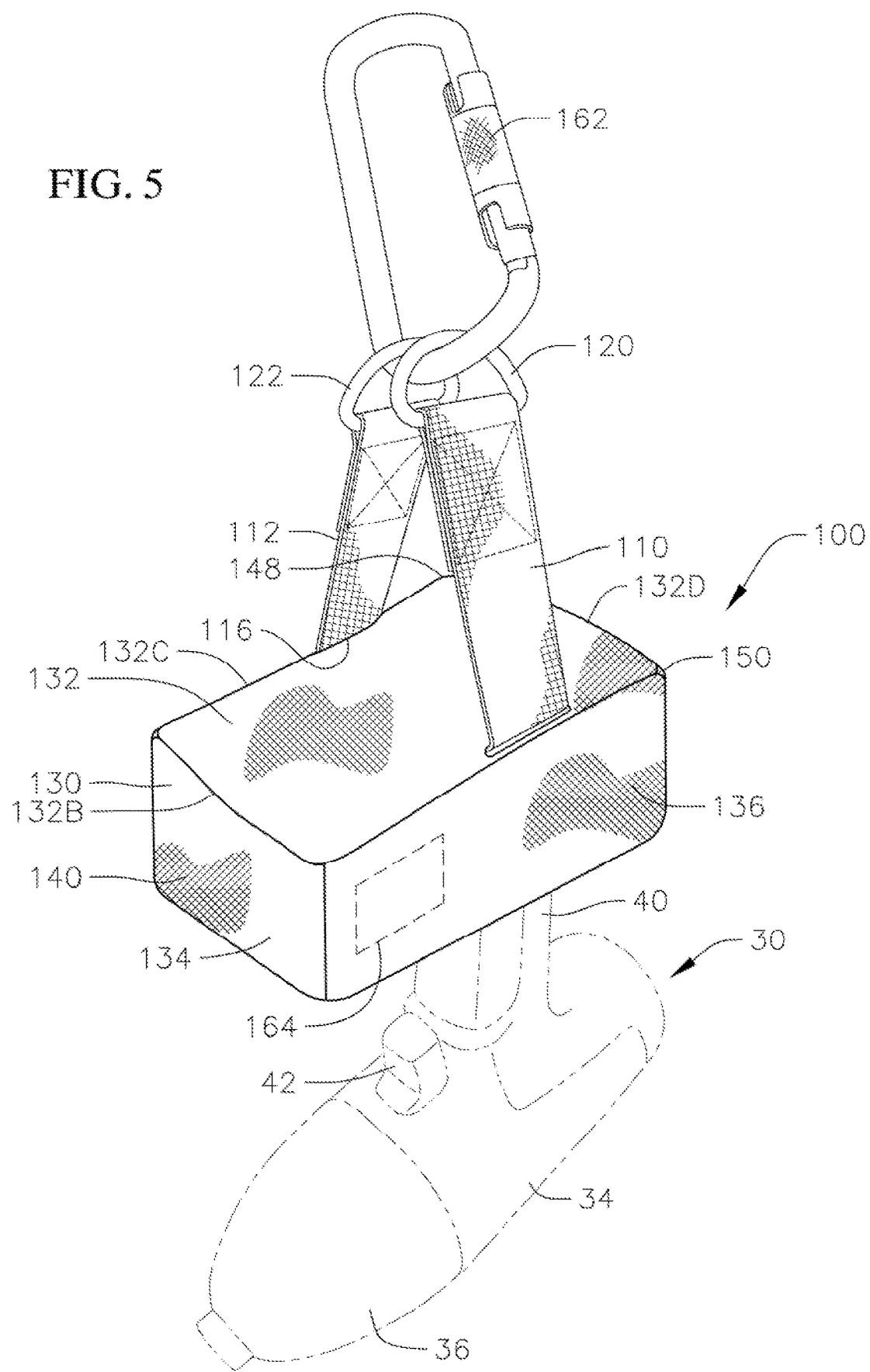
FIG. 5 depicts the case of FIGS. 1-4 with a tool hanging upside down according to various embodiments of the present invention.

In various embodiments, as shown in FIG. 1 and FIG. 5, the pocket 130 has a rectangular base panel 132 with a periphery of four generally linear side edges 132a, 132b, 132c and 132d, and a generally contiguous lateral wall 134 (e.g., with side panels and two end panels 136, 138, 140, 142 and four corners 144, 146, 148, 150 therebetween) that extends vertically or upwardly from the side edges 132a, 132b, 132c and 132d (see FIG. 5) that together define the pocket 130 with an opening that is comparable to the rectangular base panel 132 in shape and size. The wall 134 has a height dimension HW that is comparable to the height dimension BW (see FIG. 2) of the base portion of the tool such that the wall 134 covers at least 50% of the height BW of the base portion when the base portion is nested in the pocket 130. In various embodiments the pocket 130 may be constructed out of a first material that is durable yet flexible, such as a canvas, however, in various embodiments, the pocket 130 may include one or more other materials in strategic, predetermined regions of the case 100 to improve the structural integrity of the case 100 and/or provide flexibility. In various embodiments, the pocket 130 is shaped and/or sized to accommodate a strategic portion of the tool in the pocket 130 with a close and secure fit. For example, in various embodiments, the tool may be a cordless drill 30 and the pocket 130 may be shaped and/or sized to accommodate a battery 32 of the cordless drill accordingly.

The side and end panels 136-142 of the case 100 define a space volume that is configured to receive the base portion of the tool. The panels 136-142 may be deformed from their generally-planar neutral configuration so as to be separated or spread apart from each other by a user to gain wider access into the pocket 130 and to accommodate a wide variety of battery sizes.

In some embodiments, the pocket 130 is formed from a planar sheet of material that is folded, stitched, and/or cut, or otherwise shaped into the pocket 130 with the base 132, the side panels 136-138 and corners 144-150.

Figure 4:
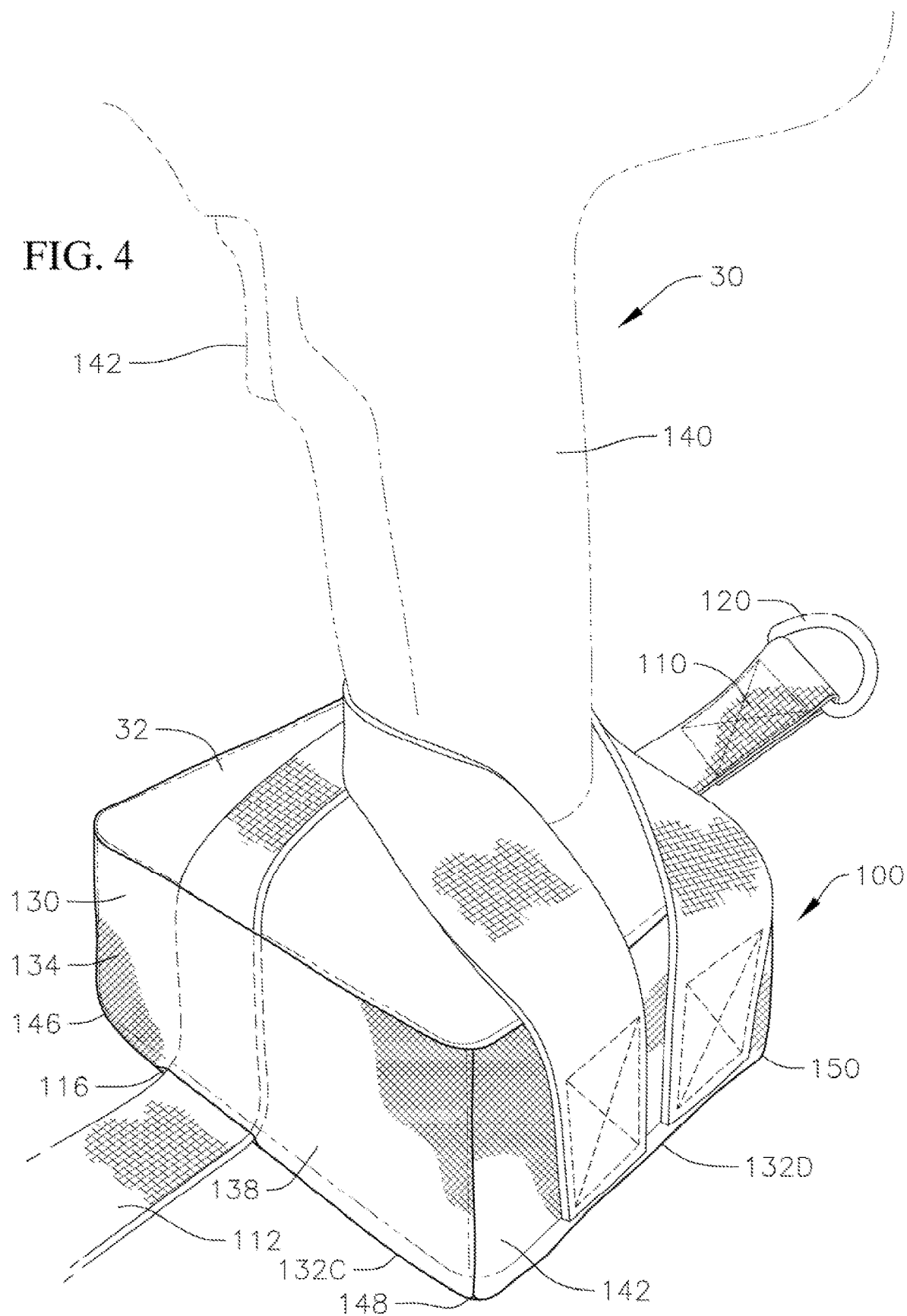
FIG. 4 depict a case for a tool having the straps wrapped around the tool from a rear perspective of the case of FIGS. 1-3.

In various embodiments, the case 100 having a pocket 130 and straps 110 and 112, may function similar to, for example, a shoe for holding a foot and laces for fastening the shoe to the foot, in terms of the pocket 130 for holding the battery 32 and straps 110, 112 for wrapping or lacing around the handle 40 and securing the drill 30 in the pocket 130. In some embodiments, as shown in FIG. 4, the straps 110, 112 are attached to and extend from the second end portion 142 of the pocket 130. The straps 110, 112 may be constructed using of a durable woven nylon. In some embodiments, a proximal end of each of the straps 110, 112 is affixed to the first end panel 140 and a distal end of each of the straps includes a respective fastener, e.g. D-ring 120, 122 ("fastener" and "D-rings" used interchangeably herein). The proximal end of the straps 110, 112 may be attached to the second end panel 142 using stitching, adhesive, welding, or any other any suitable attachment mechanism with the capability of maintaining the attachment in the event of a tool drop. In some embodiments the straps 110, 112 may be integral with second end panel 142, extending upwards from a top edge.

The fasteners, e.g., D-rings 120, provide for an attachment mechanism so that the tool may be safely tethered to a person, safety harness, or other attachment point, e.g., carabiner, so as to prevent the drill 30 from being dropped and detaching from the person.

Figure 8:
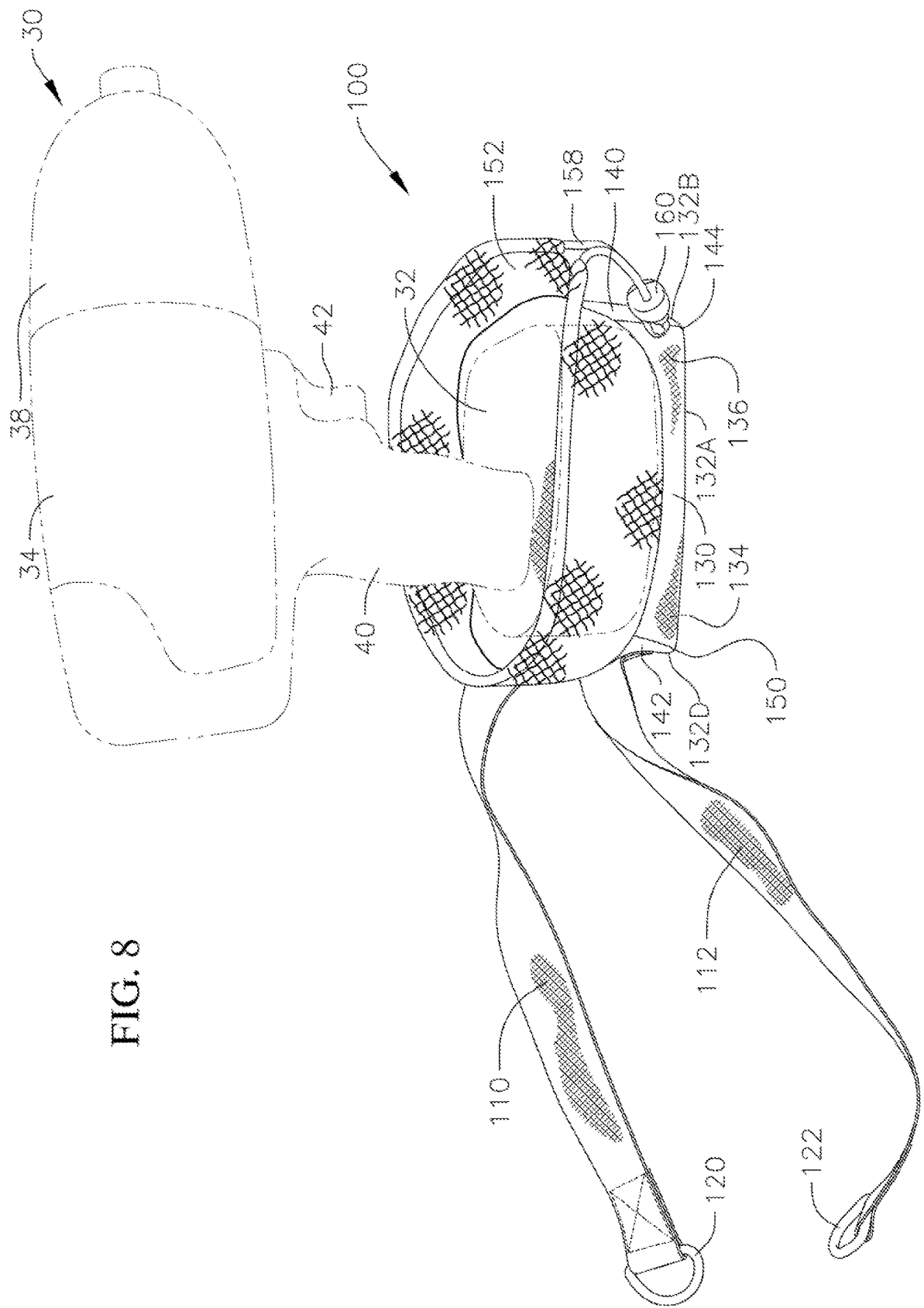
FIG. 8 depicts the case for a tool with a sample tool, namely, a cordless drill in the case from a side perspective according to various embodiments of the present invention.

In various embodiments, the case 100 includes an upper portion or a neck 152 that can be tightened or cinched around the handle of the tool, as shown in FIGS. 6-8. The upper portion 152 is constructed using a more flexible material, lighter, thinner, and/or more stretchable material than the material forming the pocket 130. For example, the upper portion 152, e.g., of nylon or elastic webbing, mesh or netting, is configured as an extension of the side and end panels 136-142 of the pocket 130, with a generally tubular form having two open ends 154, 156 wherein the first open end is affixed to the side and end panels 136-142 around the first opening 154, e.g., forming a seam S, so that the first open end is in communication with the first opening and the second open end defines a second opening 156 into the pocket 130. The second opening 156 can be comparable to, or larger or smaller than, the first opening 154 and the second opening 156 can cinched around the handle of the tool by a tensile member 158, such as drawstring or cord. The material of the upper portion 152, e.g., of webbing, mesh or the netting, can better conform around the upper region of the battery 32 and around the handle 40. The material of the upper portion 152, e.g., of webbing, mesh or netting, allows better visibility into the pocket 130 and can be bunched or gathered up more readily to conform to the handle of the tool. The tensile member 156 cinches the second opening around the handle 40 and brings the upper portion 152 in contact with the upper surface 18 of the battery 32 and the handle 40. A cord lock 158 may be used to ensure the opening remains cinched.

Figure 9:
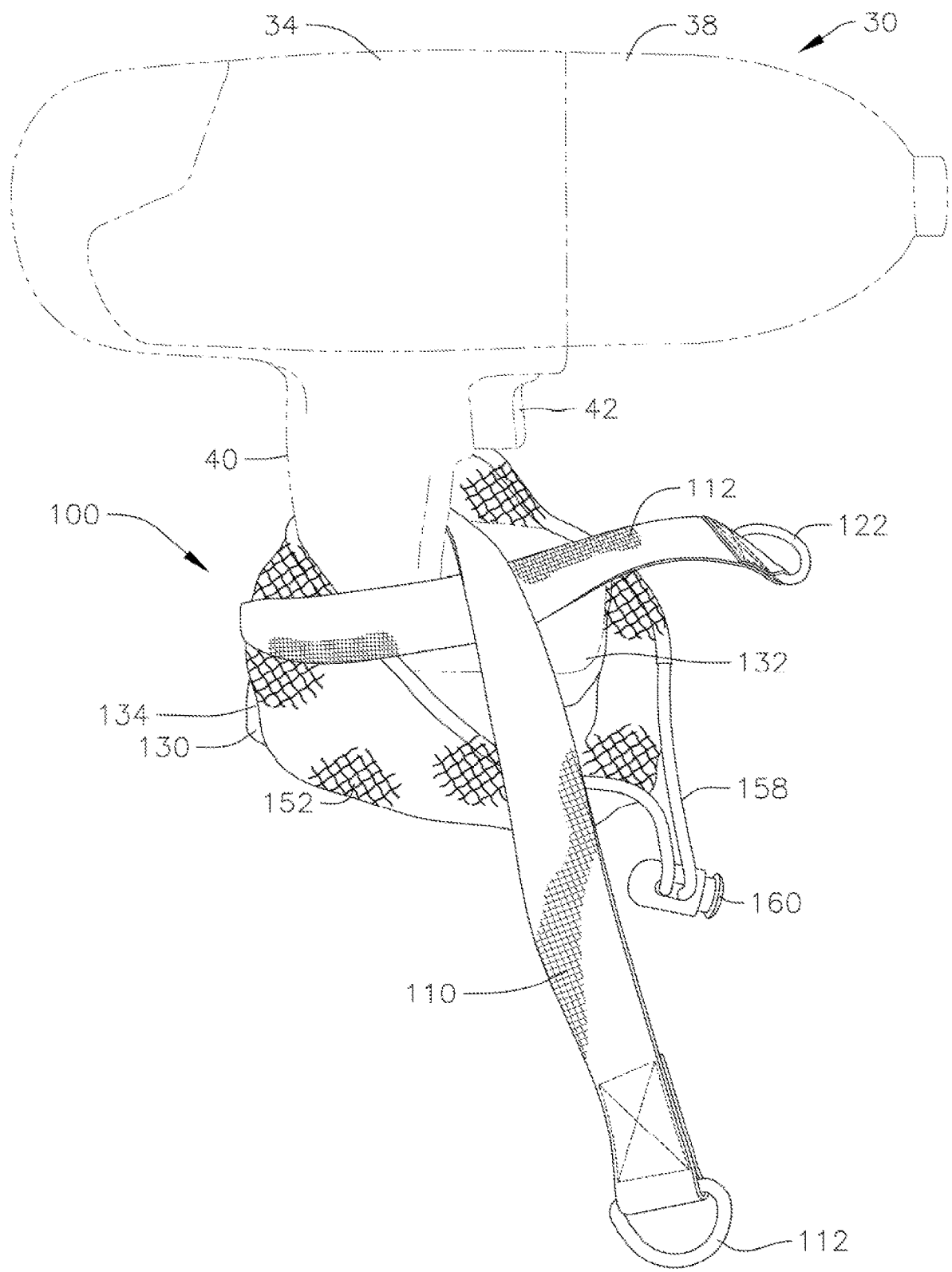
FIG. 9 depicts a side perspective view of the case having the sample tool with the straps wrapping around the handle of the tool according to various embodiments of the present invention.
Figure 10:
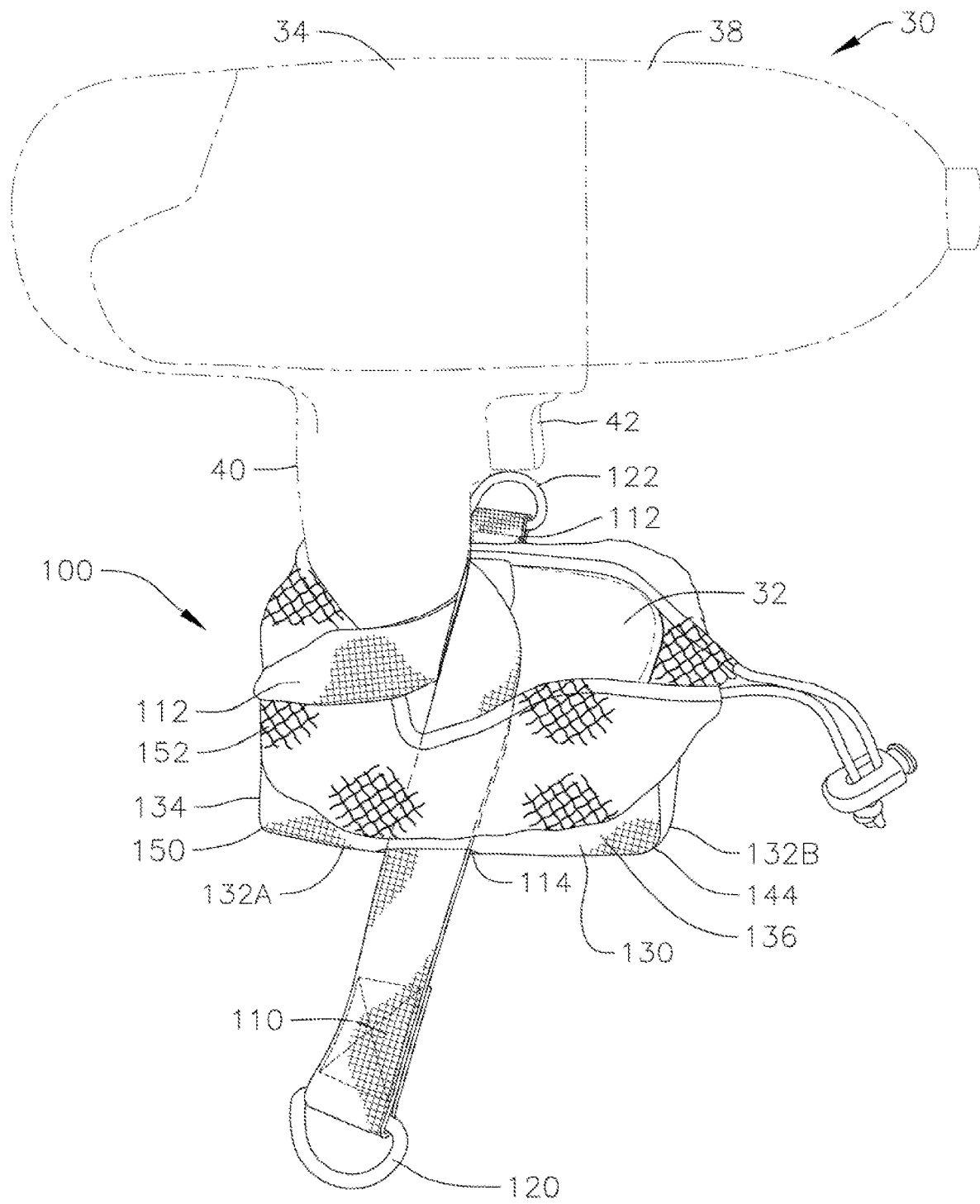
FIG. 10 depicts a side perspective view of the case having the straps wrapped around the handle and fed through the bottom of the case according to various embodiments of the present invention.
Figure 11:
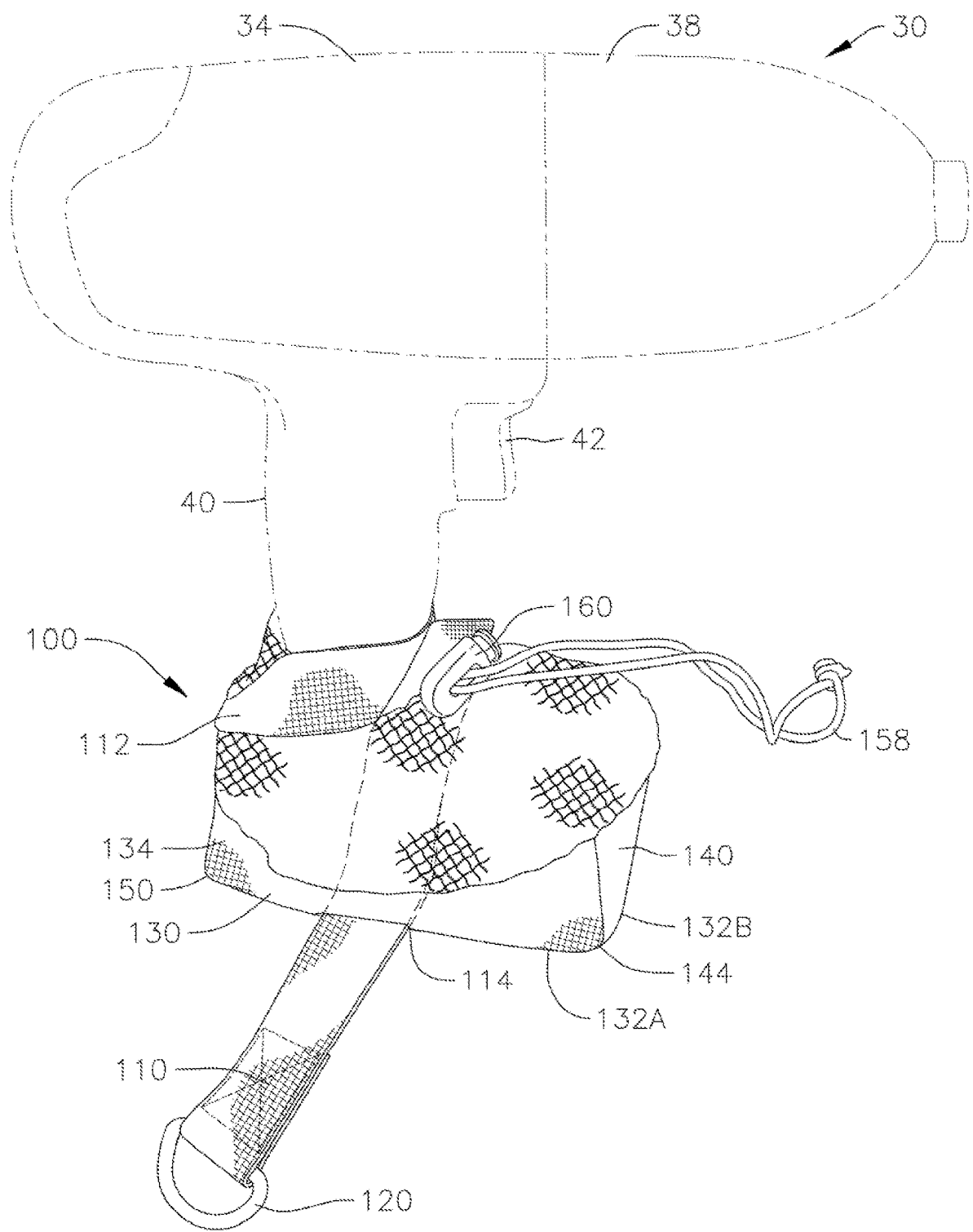
FIG. 11 depicts side perspective view with the upper portion enclosed around the tool according to various embodiments of the present invention.
Figure 12:
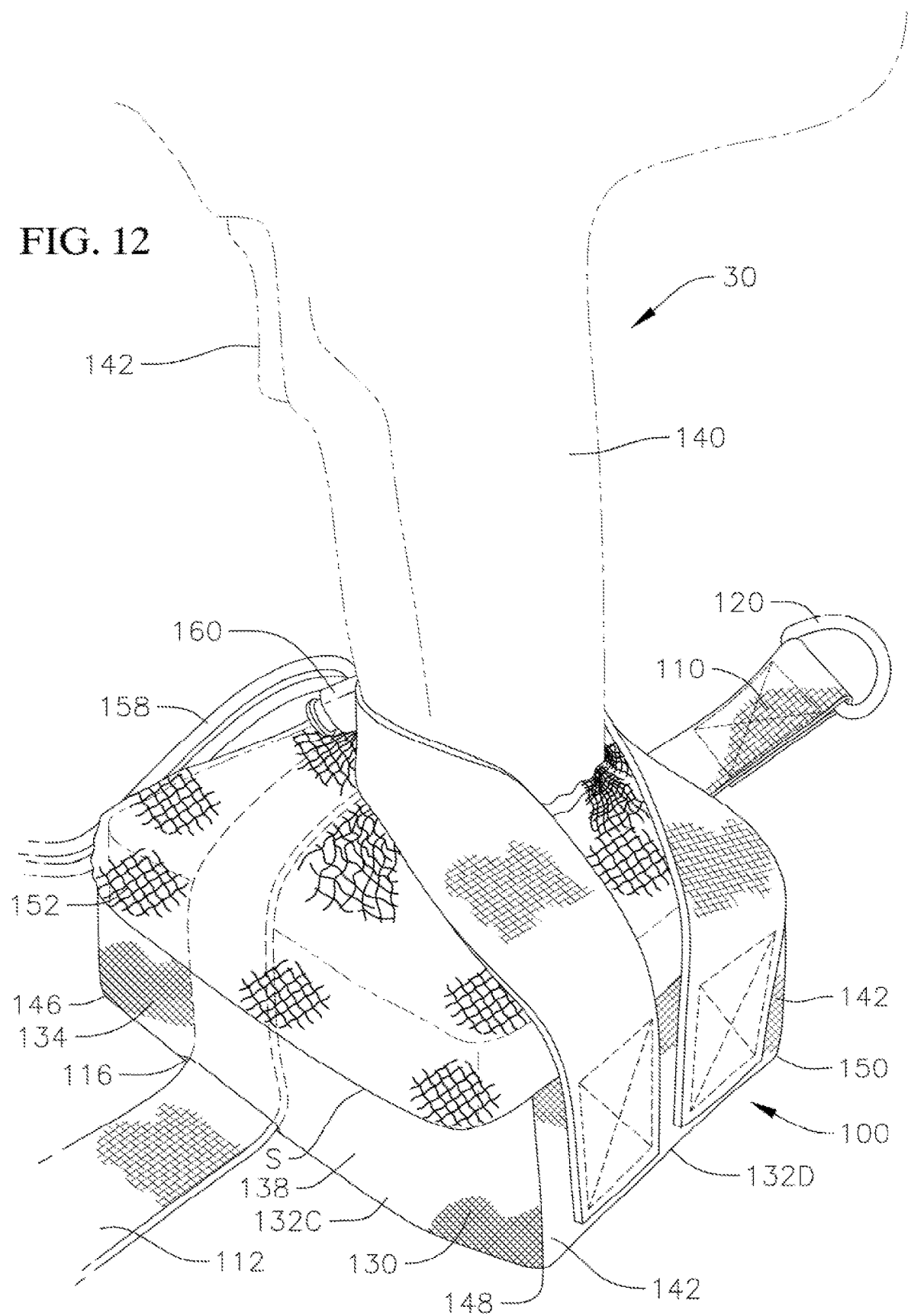
FIG. 12 depict a case for a tool having the straps wrapped around the tool from a rear perspective of the case of FIGS. 6-11.

FIG. 4 and FIG. 9, depict a case 100 for a tool according to various embodiments of the present invention. The case 100 is designed to allow a portion of the drill 30 to be secured within the case 100, but still allow for easy and unobstructed use of the drill, and for the case 100 to be easily secured and removed. In various embodiments, the case 100 is configured such that the straps 110, 112 are able wrap around the drill handle 40 and battery 32 to retain the battery inside the pocket 130 and secure the drill to the case 100. For example, the drill is positioned relative to the pocket 130 such that the handle is adjacent the proximal affixed ends of the straps 110, 112 so that the straps may be wrapped around the handle 40 and battery 32 in a crisscross fashion and then fed through opposing slots 114, 116 formed in the pocket 130. To crisscross, the straps 110, 112 are extended towards the first end panel 140 until reaching the handle 40, as shown in FIG. 4 and FIG. 9. The straps 110, 112 may then form a cross 118 just to the front of the handle 40 and on the upper surface 18, as shown in FIG. 9. The distal ends of the straps 110, 112 are then fed through the slots 114, 116. The resulting configuration allows for the straps 110, 112 to create a tight "strangle hold" around the junction of the handle 40 and the battery 32, as shown in FIG. 10, that increases in tightness in the event of the drill being dropped because the drill's own weight causes the strangle hold to become tighter. After the straps 110, 112 have been fed through the slots 114, 116, for the case having the upper portion 152, the tensile member 158 may be cinched using the cord lock 160 giving the case 100 a more conforming and neat appearance. It is understood that the straps 110, 112 may be crisscrossed, fed through the slots 114, 116 in the same manner whether or not the case 100 has the upper portion 152. But where the case includes the upper portion 152, the tensile member 158 is typically cinched after the straps 110, 112 have been fed through the slots 114, 116, as shown in FIG. 10 followed by FIG. 11 and FIG. 12.

Figure 13:
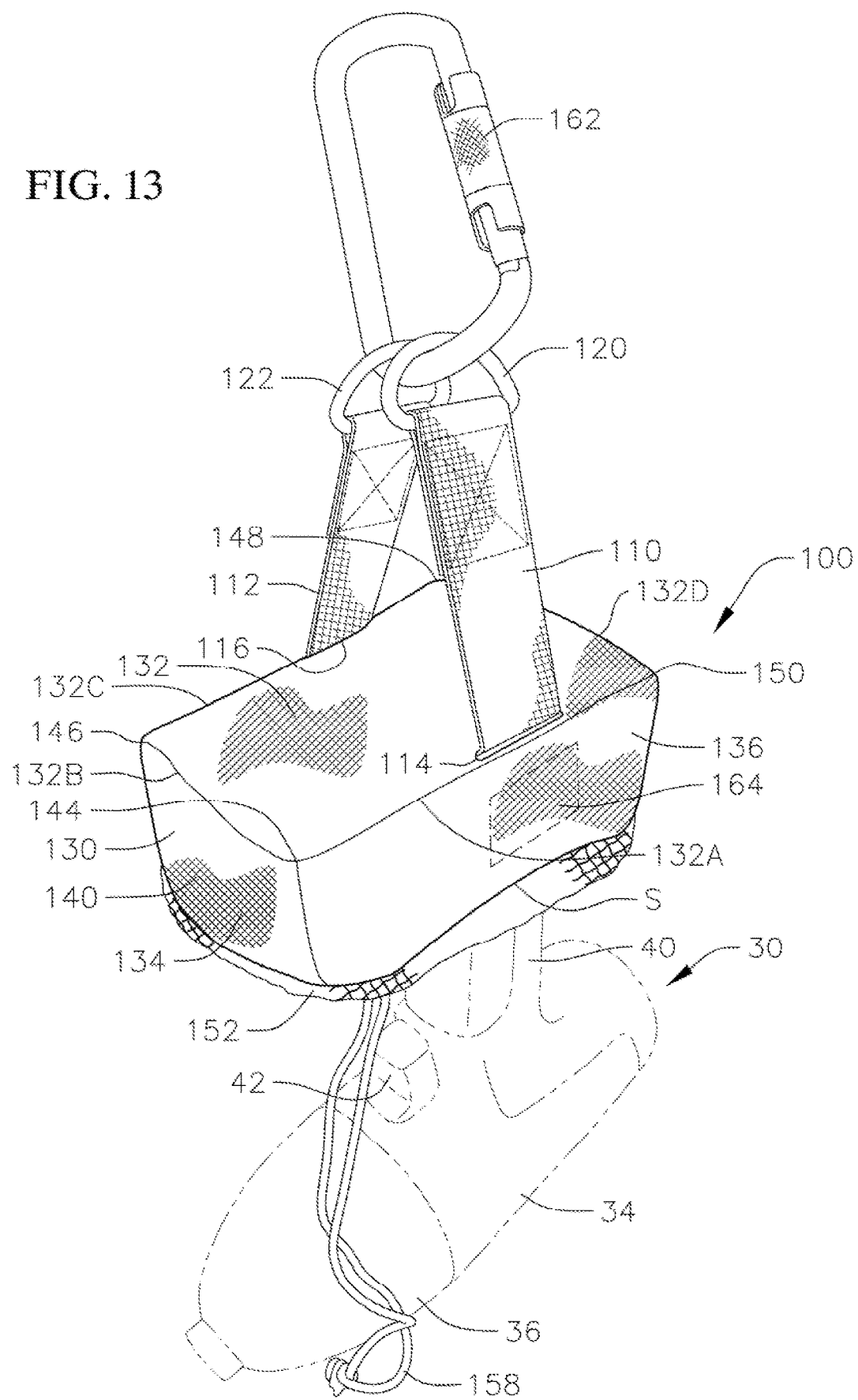
FIG. 13 depicts the case of FIGS. 6-12 with a tool hanging upside down according to various embodiments of the present invention.

In various embodiments, the straps 110, 112 have a length L that is suitable for accommodating a variety of tools (e.g., the cordless drill 30) made by a variety of different manufacturers while still allowing for the D-rings 120, 122 to be fastened together, as shown in FIG. 5 and FIG. 13. The length L, however is short enough to avoid excessive twisting or swinging when the tool is hung upside down in the case 100. In various embodiments, the straps 110, 112, the fasteners, and the slots 114, 116 are complementary in thickness and width, such that they are configured to allow for the straps 110, 112 and the fasteners to pass through the slots 114, 116.

In various embodiments, the slots 114, 116 are located near or on a delineation (e.g., a fold line or a seam) between the base panel 132 and the side panels 136, 138 of the pocket 130 (see, e.g., FIG. 1). For example, in some embodiments, the slots 114, 116 may be located along the delineation at or near a mid-location between the two end panels 140,142 (see, e.g., FIG. 12). As such, the fasteners, e.g., D-rings 120, 122, will meet at near or at along the longitudinal axis coinciding with the center of gravity of the drill 30 when the drill is hanging in the case 100.

FIG. 5 and FIG. 13 depict a case 100 for a tool in a dropped or hanging orientation according to various embodiments of the present invention. In various embodiments, the distal ends of the straps 110, 112 are held in a converged orientation using fasteners 120, 122 (e.g., D-rings). In some embodiments, the fasteners 120, 122 may be used in combination with a tether fastener 162 which is also suitably attached to an anchored safety tether. The tether fastener 162 may be a releasable fastener, e.g., a carabiner, that is configured to releasably coupled the D-rings 120, 122 to the safety tether and thereby prevent the drill 30 from being dropped a dangerous distance. In various embodiments, when the drill 30 is in a hanging orientation (as depicted), the weight of the drill is held by the straps 110, 112. The straps 110, 112 constrict around the handle 40 at the cross 118 and thereby securing the drill 30 by holding the battery within the pocket 130. As discussed above, the battery 32 is nearly as heavy as or heavier than the remainder the drill 30. Thus, when in a hanging position, the center of gravity causes the fasteners 120, 122 to meet at near or at along the longitudinal axis coinciding with the center of gravity of the drill 30. Thus, the drill hangs in a generally stable position from the D-rings 120, 122 without excessive any swinging or twisting motions of the case 100 and the tool 30 when they are coupled to and hanging by the safety tether.

Figure 14A:
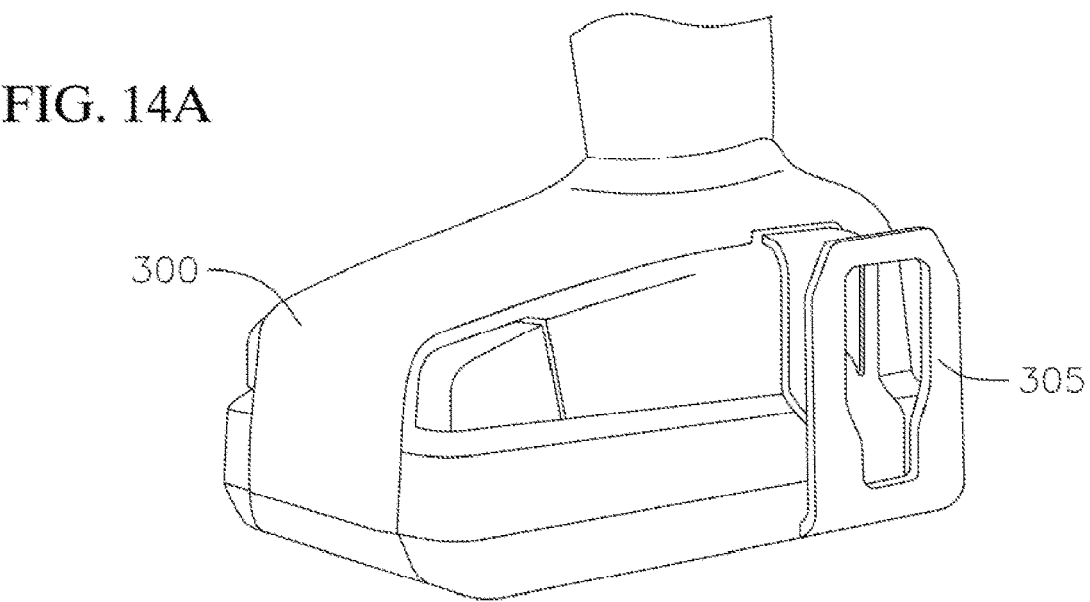
FIG. 14A, FIG. 14B, and FIG. 14C depict example tool batteries that include additional features.
Figure 14B:
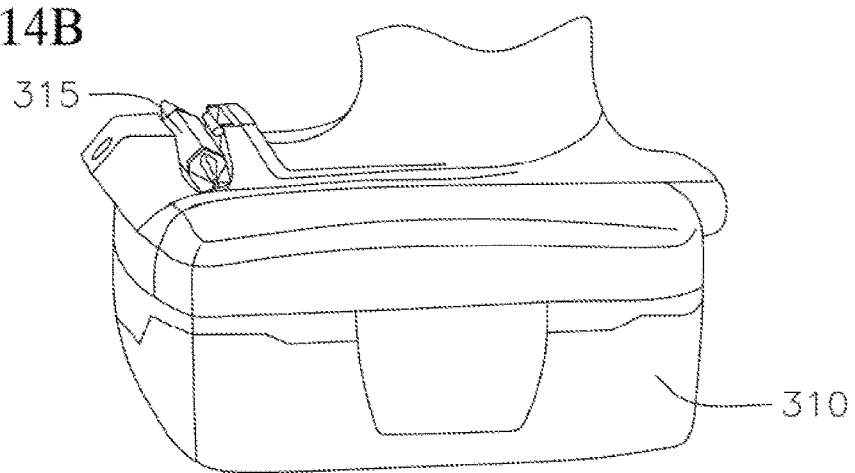
Figure 14C:
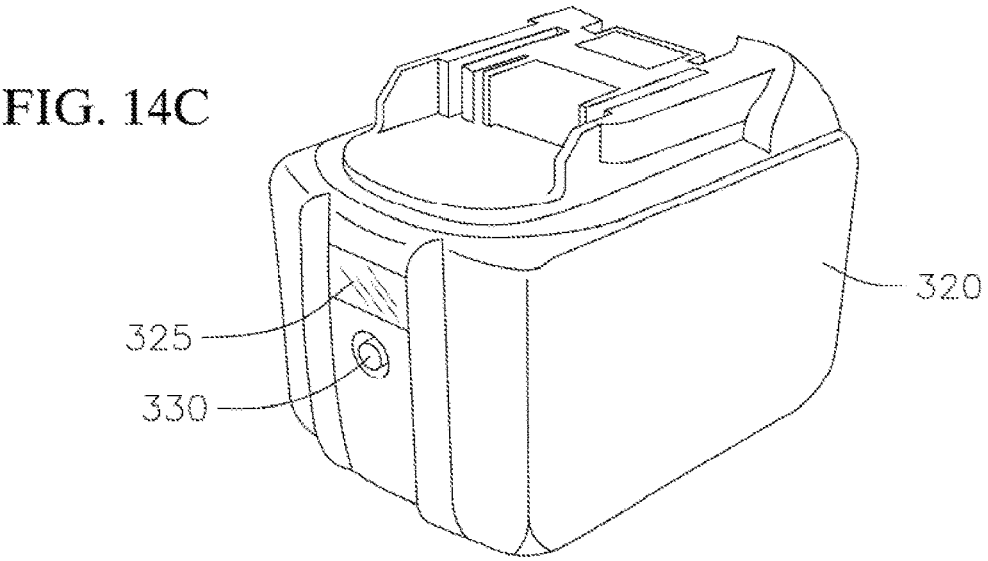

FIG. 14, FIG. 14B, and FIG. 14C depict batteries having additional features. In various embodiments, the pocket 130 may be configured to accommodate the additional features of various batteries. For example, a first battery 300 includes a waist clip 305 for securing the drill to a user's waist. In various embodiments, as shown in FIG. 5 and FIG. 13 the pocket 130 may include an aperture 164, e.g. a slot, window, hole, or other mechanism allowing for the belt clip 305 to be positioned outside of the case 100, thereby allowing the user to clip the drill to their person as if the case 100 was not being used. A second battery 310 includes a drill bit holder 315. In various embodiments, the shell may include an aperture 164 that allows for access to the any stored drill bits on the second battery 310. A third battery 320 includes a display 325 and a switch 330. In various embodiments, the shell may include the aperture 164 that allows for access to and viewing of the display 325 and switch 330.

In the preceding description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A case for a tool comprising:
   a pocket having panels including a base panel, first and second side panels, and first and second end panels,
   a pair of slots formed in the panels;
   an upper portion extending from the first side panel, second side panel, first end panel and second end panel; and
   a pair of straps, each of the straps having a fixed end affixed to the pocket and a free end, each of the straps configured to wrap over a portion of the tool and extend through a respective slot, each of the free ends configured to converge at an elevation above the base panel, the side and end panels and the upper portion when the tool is suspended by the case.

2. The case of claim 1, wherein the upper portion comprises an opening having a tensile member and a cord lock configured to cinch the opening around the base portion of the tool.

3. The case of claim 1, wherein the fixed ends of the straps are affixed to one of the end panels.

4. The case of claim 1, wherein the slots are formed on or about a delineation between the base panel and the side panels.

5. The case of claim 1, wherein each of the straps is configured to extend from the base panel from its fixed end, into the pocket through an opening defined by the upper portion, and through a respective slot to outside the pocket.

6. The case of claim 1, wherein the straps are configured to constrict around the portion of the tool when the tool is suspended in the case under force of gravity.

7. The case of claim 1, wherein the pocket includes an aperture configured to allow access into the pocket.

8. The case of claim 1, wherein each of the free ends of the straps has a fastener configured for coupling to the tether fastener.

9. The case of claim 1, wherein an upper edge of the upper portion has a drawstring.

10. The case of claim 1, wherein the upper portion includes a mesh material.

11. The case of claim 1, wherein the pocket includes a less flexible material and the upper portion includes a more flexible material.

12. The case of claim 1, wherein the pocket includes a less elastic material and the upper portion includes a more elastic material.

13. The case of claim 1, wherein the tool includes a drill with a battery.

14. The case of claim 1, wherein each free end includes a respective fastener.

15. The case of claim 14, wherein the tool is suspended upside down in the case.

16. The case of claim 1, wherein the case when tethered with the tool is configured to hang with the free ends of the straps being above the base panel and the fixed ends of the straps, and the base panel being above the upper portion.

* * * * *